United States Patent
Baek et al.

(10) Patent No.: US 11,902,639 B2
(45) Date of Patent: Feb. 13, 2024

(54) ELECTRONIC DEVICE INCLUDING WINDOW FOR OPTICAL MODULE

(71) Applicant: Samsung Electronics Co., Ltd., Gyeonggi-do (KR)

(72) Inventors: Moohyun Baek, Gyeonggi-do (KR); Youngchul Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/702,946

(22) Filed: Mar. 24, 2022

(65) Prior Publication Data

US 2022/0394157 A1 Dec. 8, 2022

Related U.S. Application Data

(63) Continuation of application No. PCT/KR2022/003262, filed on Mar. 8, 2022.

(30) Foreign Application Priority Data

Jun. 4, 2021 (KR) .................. 10-2021-0072650

(51) Int. Cl.
*H04N 23/51* (2023.01)
*G03B 30/00* (2021.01)
(Continued)

(52) U.S. Cl.
CPC ............ *H04N 23/51* (2023.01); *G03B 30/00* (2021.01); *H04N 23/54* (2023.01); *H04N 23/55* (2023.01); *H04N 23/57* (2023.01)

(58) Field of Classification Search
CPC ........ H04N 23/51; H04N 23/54; H04N 23/55; H04N 23/57; G03B 30/00; G03B 17/12; H04M 1/0269; H04M 1/0264
See application file for complete search history.

(56) References Cited

U.S. PATENT DOCUMENTS 8,014,142 B2 * 9/2011 Prest .................. H05K 5/03
349/56
9,716,815 B2 * 7/2017 Kwong .................. H04N 23/55
(Continued)

FOREIGN PATENT DOCUMENTS

CN 206878885 U 1/2018
KR 10-2013-0094500 A 8/2013
(Continued)

OTHER PUBLICATIONS

International Search Report dated Jun. 21, 2022.

*Primary Examiner* — Chiawei Chen
(74) *Attorney, Agent, or Firm* — Cha & Reiter, LLC

(57) ABSTRACT

According to certain embodiments of the disclosure, an electronic device may include a housing, a window frame disposed in the housing and providing at least one opening exposing an inside of the housing to an outside of the housing, at least one window coupled to the window frame to close the at least one opening, and at least one optical module disposed inside the housing and configured to receive external light incident through the at least one window. The at least one window may include an inner surface facing the inside of the housing, a side surface facing an inner wall of the at least one opening, and a first inclined surface connecting the side surface to the inner surface. The first inclined surface may be inclined with respect to the inner surface and the side surface and may be bonded to the inner wall. Other various embodiments are possible as well.

16 Claims, 14 Drawing Sheets

(51) Int. Cl.
*H04N 23/54* (2023.01)
*H04N 23/55* (2023.01)
*H04N 23/57* (2023.01)

(56) References Cited

U.S. PATENT DOCUMENTS

| | | | |
|---|---|---|---|
| 11,012,601 B1* | 5/2021 | Yue | H04N 23/57 |
| 2005/0219717 A1 | 10/2005 | Uehira et al. | |
| 2006/0043622 A1 | 3/2006 | Kumazawa et al. | |
| 2006/0139772 A1 | 6/2006 | Watanabe et al. | |
| 2008/0093348 A1 | 4/2008 | Seita et al. | |
| 2012/0314309 A1* | 12/2012 | Tatebayashi | G02B 7/021 |
| | | | 359/819 |
| 2013/0215323 A1 | 8/2013 | Kim et al. | |
| 2013/0313672 A1 | 11/2013 | Min et al. | |
| 2014/0111927 A1* | 4/2014 | Raff | G06F 1/1637 |
| | | | 156/60 |
| 2014/0253799 A1 | 9/2014 | Moon et al. | |
| 2015/0198976 A1* | 7/2015 | Raff | G06F 1/16 |
| | | | 361/679.3 |
| 2016/0156755 A1* | 6/2016 | Choi | G06F 1/1658 |
| | | | 455/575.1 |
| 2017/0285686 A1* | 10/2017 | Kwong | G06F 1/1656 |
| 2018/0059454 A1 | 3/2018 | Shin et al. | |
| 2018/0090974 A1 | 3/2018 | Elkayam et al. | |
| 2019/0025885 A1* | 1/2019 | Kwong | H04N 23/55 |
| 2019/0082083 A1* | 3/2019 | Jarvis | H04N 23/54 |
| 2019/0339746 A1 | 11/2019 | Kim et al. | |
| 2020/0017037 A1* | 1/2020 | Masui | H04N 23/55 |
| 2021/0005836 A1 | 1/2021 | Yee et al. | |
| 2021/0091148 A1 | 3/2021 | Kim et al. | |
| 2021/0096318 A1* | 4/2021 | Dobashi | H04N 23/57 |
| 2021/0281722 A1* | 9/2021 | Jeong | H04N 23/54 |
| 2023/0176265 A1* | 6/2023 | Xu | G02B 13/0065 |
| | | | 359/838 |

FOREIGN PATENT DOCUMENTS

| | | |
|---|---|---|
| KR | 10-2014-0044969 A | 4/2014 |
| KR | 10-2018-0025383 A | 3/2018 |
| KR | 10-2019-0028284 A | 3/2019 |
| KR | 10-2019-0126673 A | 11/2019 |

* cited by examiner

FIG.10
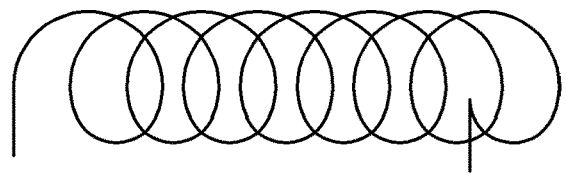
FIG.11
FIG.12
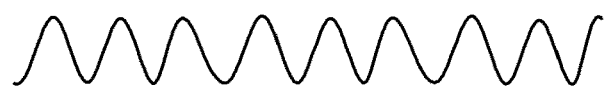
FIG.13

ELECTRONIC DEVICE INCLUDING WINDOW FOR OPTICAL MODULE

CROSS-REFERENCE TO RELATED APPLICATION(S)

This application is a continuation of International Application No. PCT/KR2022/003262, which was filed on Mar. 8, 2022, and claims priority to Korean Patent Application No. 10-2021-0072650, filed on Jun. 4, 2021, in the Korean Intellectual Property Office, the disclosure of which are incorporated by reference herein their entirety.

BACKGROUND

Technical Field

One or more embodiments of the instant disclosure generally relate to electronic devices, e.g., electronic devices that includes a window for an optical module, such as a camera, and/or a window for a display.

Description of Related Art

With the development of information and communication technology and semiconductor technology, the distribution and use of various electronic devices is rapidly increasing. Recent electronic devices may output the stored information as sounds or images and may provide information desired by the user through wireless communication. As electronic devices are highly integrated, and high-speed/high-volume wireless communication becomes commonplace, electronic devices, such as mobile communication terminals, have been recently implemented to perform various functions. For example, an electronic device may implement entertainment function, such as playing video games, multimedia function, such as replaying music/videos, communication and security function for mobile banking, and scheduling and e-wallet function. As these electronic devices are portable, users have demanded improved exterior design for these electronic devices.

Improved exterior design of the electronic devices may be achieved by harmoniously arranging various visually exposed structures, as well as exterior shapes and colors of these structures. The "visually exposed structures" may include, e.g., holes for various connectors, holes for sound input/output, mechanical buttons, and a window for camera or display. The shape, boundary, and color of these structures may affect how the appearance of the electronic devices is designed.

The above-described information may be provided as background for the purpose of helping understanding of the disclosure. No claim or determination is made as to whether any of the foregoing is applicable as background art in relation to the disclosure.

SUMMARY

A window for an optical module, such as a camera, or a window for a display may be made of, e.g., a substantially transparent extrudate or glass plate, and the window may be attached to a structure of the electronic device, such as a housing. Because spaces in the electronic device are at a premium, to minimize the space used by the optical module, the area through which light may be actually transmitted relative to the total area of the window may be limited. This way, the remaining area of the window may be used to attach it to another structure. As such, as the attachment area becomes larger, the proportion of the area through which light may be transmitted in the window may be limited. This attachment area may typically be disposed on the inner surface of the substantially transparent window, and it may thus be visible from the outside of the electronic device or housing. Accordingly, the attachment area may limit the ways in which the external appearance of the electronic device can be designed. In contrast, when the attachment area is designed to be decorative, it may unnecessarily visually expose internal elements of the electronic device.

Without being limited to the foregoing issues, additional aspects according to certain embodiments will be disclosed below in relation with the detailed description and will be apparent to or understood by one of skill in view of the disclosed embodiments.

According to certain embodiments of the disclosure, an electronic device may comprise a housing, a window frame disposed in the housing and providing at least one opening exposing an inside of the housing to an outside of the housing, at least one window coupled to the window frame to close the at least one opening, and at least one optical module disposed inside the housing and configured to receive external light incident through the at least one window. The at least one window may include an inner surface facing the inside of the housing, a side surface facing an inner wall of the at least one opening, and a first inclined surface connecting the side surface to the inner surface. The first inclined surface may be inclined with respect to the inner surface and the side surface and may be bonded to the inner wall.

According to certain embodiments of the disclosure, an electronic device may comprise a housing, a display disposed on a first surface of the housing, a window frame disposed in the housing and providing at least one opening exposed to a second surface of the housing, at least one window coupled to the window frame to close the at least one opening, and at least one optical module disposed inside the housing and configured to receive external light incident through the at least one window. The at least one window may include an inner surface facing an inside of the housing, a side surface facing an inner wall of the at least one opening, and a first inclined surface connecting the side surface to the inner surface. The window frame may include a second inclined surface formed as a portion of the inner wall. The second inclined surface may be at least partially fused with the first inclined surface.

Other aspect(s), advantage(s) and major configuration(s) of the disclosure will become apparent to one of ordinary skill in the art from the following detailed description of various embodiments with reference to the accompanying drawings.

BRIEF DESCRIPTION OF THE DRAWINGS

The foregoing and other aspects, configuration(s), and/or advantage(s) of various embodiments of the disclosure will be more apparent from the following detailed description taken in conjunction with the accompanying drawings.

FIGS. 10 to 13 are views illustrating a pattern in which a window is fused to a window frame in an electronic device according to certain embodiments of the disclosure;

Throughout the drawings, like reference numerals may be assigned to like parts, components, and/or structures.

DETAILED DESCRIPTION

Figure 1:
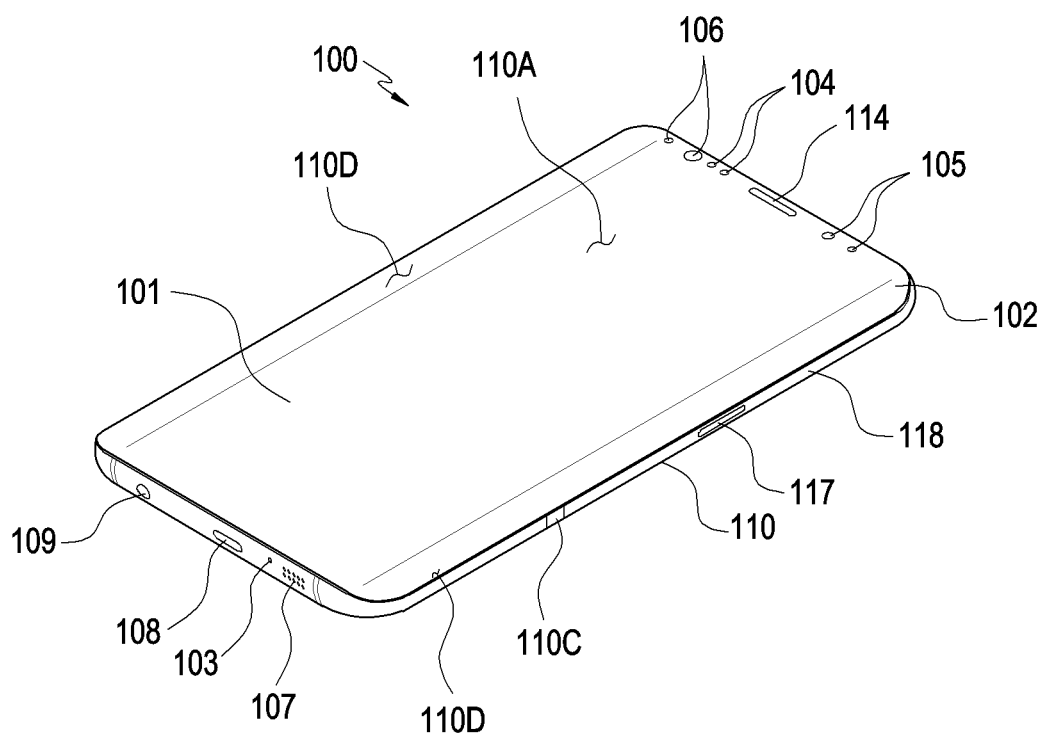
FIG. 1 is a front perspective view illustrating an electronic device according to an embodiment of the disclosure.

Certain embodiments of the disclosure aim to address the foregoing issues and/or drawbacks and provide an electronic device including a window for an optical module, where the attachment area of the window is reduced, thereby enhancing the degree of freedom in which the outer appearance of the electronic device can be designed.

Certain embodiments of the disclosure may provide an electronic device including a window for an optical module that is firmly bonded with the attachment area reduced.

According to certain embodiments of the disclosure, the window is fused to another structure (e.g., housing or window frame) to thereby reduce the area required for window attachment. For example, when the window is bonded using general adhesive or adhesive tape, the bonding area may have a width of about 1 mm. However, when fused, the bonding area may have a width of about 0.5 mm or less, but at the same time the bonding strength may be equal to or more than that of the bonding using general adhesive. This way, the electronic device according to certain embodiments of the disclosure may have a smaller attachment area but exhibit the same or better bonding strength, and that would enhance the degree of freedom in which the outer appearance of the electronic device can be designed. Other various effects may be provided directly or indirectly in the disclosure.

The following description taken in conjunction with the accompanying drawings may be presented to provide a comprehensive understanding of various implementations of the disclosure as defined by the claims and equivalents thereto. The specific embodiments disclosed in the following description entail various specific details to aid understanding, but are regarded as one or more of various embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the certain embodiments of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
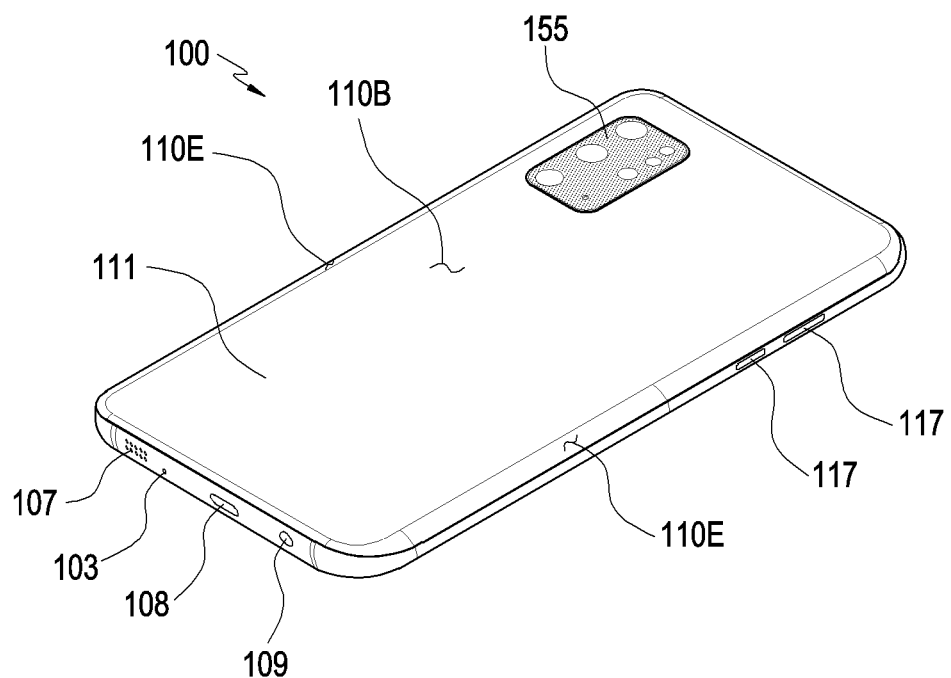
FIG. 2 is a rear perspective view illustrating an electronic device according to an embodiment of the disclosure.

FIG. 1 is a front perspective view illustrating an electronic device 100 according to an embodiment. FIG. 2 is a rear perspective view illustrating an electronic device 100 according to an embodiment of the disclosure.

Referring to FIGS. 1 and 2, the electronic device 100 according to an embodiment may include a housing 110 including a first surface (or front surface) 110A, a second surface (or rear surface) 110B, and a side surface 110C surrounding a space the first surface 110A and the second surface 110B. According to another embodiment (not shown), the housing may refer to a structure including the first surface 110A of FIG. 1, the second surface 110B of FIG. 2, and some of the side surfaces 110C of FIG. 1. According to an embodiment, the first surface 110A may be formed by a front plate 102 (e.g., glass plate or polymer plate with various coat layers) at least part of which is substantially transparent. According to another embodiment, the front plate 102 may be coupled with the housing 110 and, along with the housing 110, may form an internal space. According to certain embodiments, the "internal space" may refer to the space for receiving at least part of the display 101 and/or other internal components.

According to an embodiment, the second surface 110B may be formed of a substantially opaque rear plate 111. The rear plate 111 may be made of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 118 that couples to the front plate 102 and the rear plate 111 and may include metal and/or polymer. According to an embodiment, the rear plate 111 and the side bezel structure 118 may be integrated together and include the same material (e.g., metal such as aluminum).

In the embodiment illustrated, the front plate 102 may include two first areas 110D (e.g., curved areas), which seamlessly and bendingly extend from the first surface 110A to the rear plate 111, on both the long edges of the front plate 102. In the embodiment illustrated, the rear plate 111 may include second areas 110E (e.g., curved areas), which seamlessly and bendingly extend from the second surface 110B to the front plate 102, on both the long edges. According to other embodiments, the front plate 102 (or the rear plate 111) may include only one of the first areas 110D (or the second areas 110E). In another embodiment, some of the first areas 110D or the second areas 110E may not be included. In the above-described embodiments, at the side view of the electronic device 100, the side bezel structure 118 may have a first thickness (or width) for sides (e.g., the side where the connector hole 108 is formed) that do not have the first areas 110D or the second areas 110E and a second thickness, which is smaller than the first thickness, for sides (e.g., the side where the key input device 117 is disposed) that have the first areas 110D or the second areas 110E.

According to an embodiment, the electronic device 100 may include at least one or more of the display 101, audio modules 103, 107, and 114, the sensor module 104, camera modules 105 and 155, the key input device 117, the light emitting device 106, and connector holes 108 and 109. According to other embodiments, the electronic device 100 may exclude at least one (e.g., the key input device 117 or the light emitting device 106) of the components or may add other components.

The display 101 may be exposed through a significant portion of the front plate 102. According to an embodiment, at least a portion of the display 101 may be exposed through the front plate 102 forming the first surface 110A and the first areas 110D of the side surface 110C. According to an embodiment, the edge of the display 101 may have substantially the same shape as the adjacent outer edges of the front plate 102. According to another embodiment (not shown), the interval between the outer edge of the display 101 and the outer edge of the front plate 102 may remain substantially uniform to maximize the exposure area of the display 101.

According to another embodiment (not shown), the screen display area (e.g., the active area), or an off-area (e.g., the inactive area) of the display 101 may have a recess or opening in a portion thereof, and at least one or more of the audio module 114, sensor module 104, camera modules 105 and 155, and light emitting device 106 may be aligned with the recess or opening. According to another embodiment (not shown), at least one or more of the audio module 114, sensor module 104, camera modules 105 and 155, and light emitting device 106 may be included on the rear surface of the screen display area of the display 101. According to another embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor module 104 and/or at least part of the key input device 117 may be disposed in the first areas 110D and/or the second areas 110E.

The audio modules 103, 107, and 114 may include a microphone hole 103 and speaker holes 107 and 114. The microphone hole 103 may correspond to an internal microphone used to obtain external sound or noise. According to an embodiment, there may be a plurality of microphones, so that the direction of the sound can be detected. The speaker holes 107 and 114 may include an external speaker hole 107 and a phone receiver hole 114. According to an embodiment, the speaker holes 107 and 114 and the microphone hole 103 may be implemented as a single hole, or speakers may be implemented without the speaker holes 107 and 114 (e.g., piezo speakers).

The sensor module 104 may produce electrical signal or data value corresponding to the internal operation state or external environment state of the electronic device 100. The sensor module 104 may include a first sensor module 104

(e.g., proximity sensor) and/or a second sensor module (not shown) (e.g., fingerprint sensor) disposed on the first surface 110A of the housing 110 and/or another sensor module (not shown) (e.g., heart-rate monitor (HRM) sensor or fingerprint sensor) disposed on the second surface 110B of the housing 110. The fingerprint sensor may be disposed on the second surface 110B as well as on the first surface 110A (e.g., the display 101) of the housing 110. The electronic device 100 may further include sensor modules not shown, such as gesture sensor, gyro sensor, atmospheric pressure sensor, magnetic sensor, acceleration sensor, grip sensor, color sensor, infrared (IR) sensor, biometric sensor, temperature sensor, humidity sensor, or illuminance sensor.

The camera modules 105 and 155 may include a first camera device 105 disposed on the first surface 110A of the electronic device 100 and a second camera device 155 disposed on the second surface 110B. The second camera device 155 may include, e.g., an infrared light source, an infrared receiver, a flicker detection sensor, and/or a plurality of cameras. The camera modules 105 and 155 may include one or more lenses, an image sensor, and/or an image signal processor. A flash (not shown) may be disposed on the second surface 110B. The flash 113 may include, e.g., a light emitting diode (LED) or a xenon lamp. According to an embodiment, two or more lenses (infrared (IR) camera, wide-angle lens, and telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101.

The light emitting device 106 may be disposed on, e.g., the first surface 110A of the housing 110. The light emitting device 106 may provide, e.g., information about the state of the electronic device 100 as flashes of light that implement visual notifications. According to an embodiment, the light emitting device 106 may provide a light source that interacts with, e.g., the camera module 105. The light emitting device 106 may include, e.g., a light emitting device (LED), an infrared (IR) LED, or a xenon lamp.

The connector holes 108 and 109 may include a first connector hole 108 for receiving a connector (e.g., universal serial bus (USB) connector) for transmitting or receiving power and/or data to/from an external electronic device and/or a second connector hole 109 (e.g., earphone jack) for receiving a connector for transmitting or receiving audio signals to/from the external electronic device.

Figure 3:
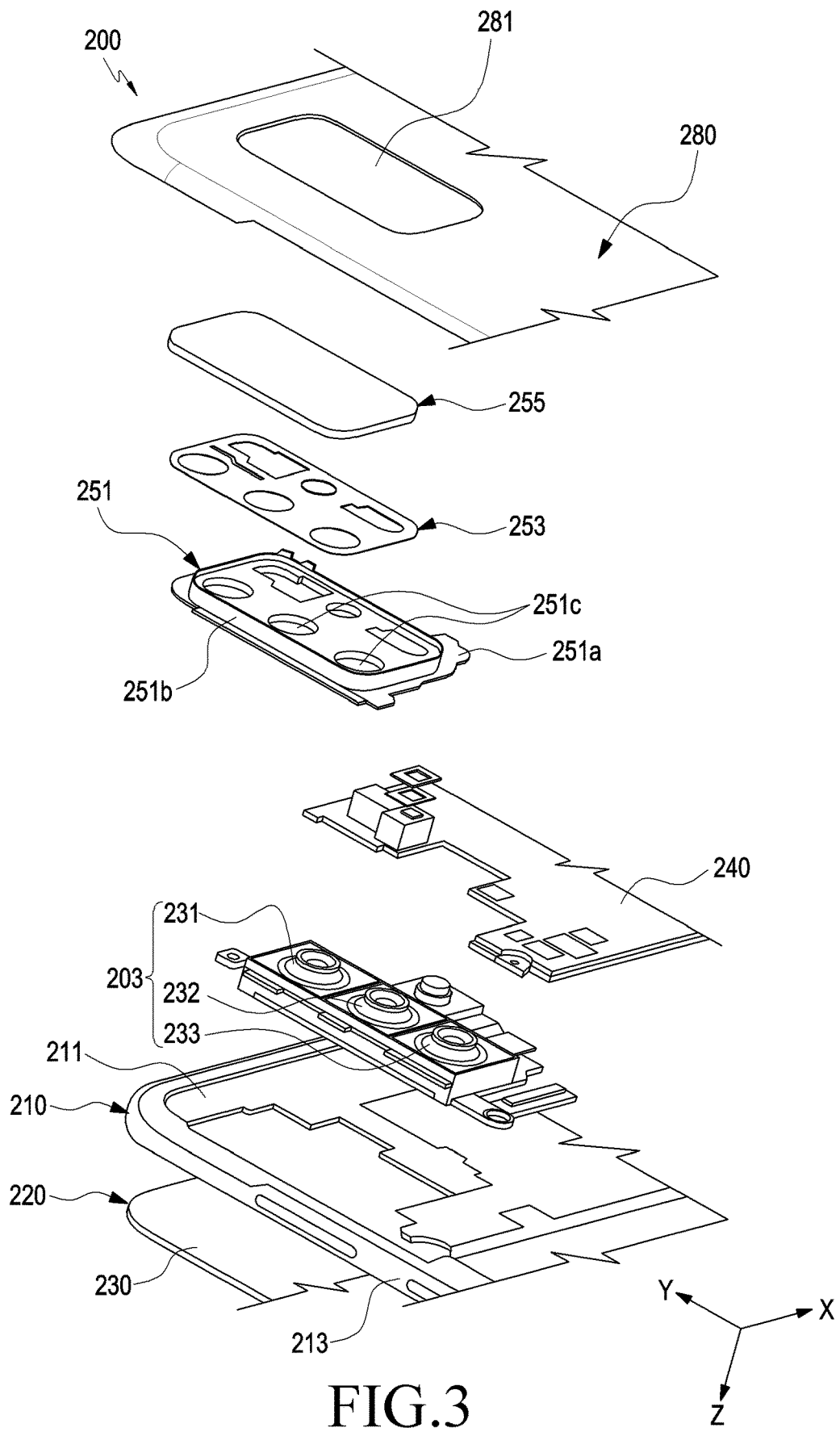
FIG. 3 is an exploded perspective view illustrating a portion of an electronic device according to an embodiment of the disclosure.

FIG. 3 is an exploded perspective view illustrating a portion of an electronic device 200 (e.g., the electronic device 100 of FIGS. 1 and/or 2) according to an embodiment of the disclosure.

Referring to FIG. 3, an electronic device 200 may include a housing 210. The housing 210 (e.g., the housing 110 of FIG. 1) may be interpreted as including a front plate 220 (e.g., the front plate 102 of FIG. 1), a rear plate 280 (e.g., the rear plate 111 of FIG. 2), and a side structure 213 (e.g., the side surface 110C of FIG. 1) surrounding a space between the front plate 220 and the rear plate 280. In some embodiments, the housing 210 may also be interpreted as including a component (e.g., camera window 255) exposed to the exterior of the electronic device 200 or a component that may be directly contacted by the user in addition to the front plate 220, the rear plate 280, and the side structure 213.

According to an embodiment, at least a portion of the front plate 220 may be substantially transparent, and it may be made of a glass plate or a polymer plate containing various coating layers. The rear plate 280 may be made of coated or tinted glass, ceramic, polymer, metal, or a combination thereof and may be substantially opaque. The side structure 213 is coupled with the front plate 220 and the rear plate 280 and may include metal and/or polymer. In an embodiment, the side structure 213 may be integrated with the rear plate 280 and may be made of the same material as the rear plate 280.

According to an embodiment, hardware or various electronic components, such as a processor or a communication module, may be disposed inside the electronic device 200. Further, some pieces of hardware or electronic components may be visually exposed to the outside of the electronic device 200. For example, the display 230 (e.g., the display 101 of FIG. 1) may be disposed on the inner surface of the front plate 220 and be disposed inside the electronic device 200 (e.g., the housing 210) while being visually exposed to the outside of the electronic device through a significant portion of the front plate 220.

According to an embodiment, the electronic device 200 may include a supporting member 211 connected with the side structure 213 and disposed inside the electronic device 200. The supporting member 211 may be made of a metallic and/or non-metallic material and may be integrated with the side structure 213. The display 330 may be disposed on one surface of the supporting member 211, and the printed circuit board 240 may be disposed on the opposite surface of the supporting member 211. A processor, memory, and/or interface may be mounted on the printed circuit board 240.

According to an embodiment, the electronic device 200 may include a camera assembly 203 including a plurality of cameras 231, 232, and 233. The electronic device 200 may include an infrared light source, an infrared receiver, and/or a flicker detection sensor disposed adjacent the camera assembly 203 (not shown). The camera assembly 203 may include a first camera 231, a second camera 232, and/or a third camera 233 arranged along the length direction Y of the electronic device 200 and may be disposed on one surface (e.g., the rear surface) of the housing 210 to face the subject whose image is to be captured. In an embodiment, the camera assembly 203 or cameras 231, 232, and 233 may be electrically connected to the printed circuit board 240 via a flexible printed circuit board and/or connector. The electronic device 200 may generate or detect distance information from the subject using the infrared light source and the infrared receiver. The flicker detection sensor may provide information necessary to eliminate distortion or defects in image data by detecting the flicker of artificial light.

According to an embodiment, the camera assembly 203 is an optical component(s) disposed inside the housing 210 to receive or output light and may be disposed in a position corresponding to the opening area 281 of the rear plate 280. In some embodiments, the infrared light source, the infrared receiver, and/or the flicker detection sensor, together with the camera assembly 203, may be disposed in the position corresponding to the opening area 281. According to an embodiment, the electronic device 200 may include a window frame 251 and/or a window 255 for sealing the opening area 281 and for providing an image-capture path of the camera assembly 203. The window frame 251 and/or the window 255 may be part of the housing 210 and may protect the camera assembly 203 from the external impact and may impart a decorative effect to the appearance of the electronic device 200.

According to an embodiment, the window frame 251 may be made of a synthetic resin or a metal and may be disposed on the inner surface of the rear plate 280 (facing the supporting member 211) to seal or close the opening area 281. In an embodiment, the window frame 251 may provide at least one opening 251c corresponding to the cameras 231, 232, and 233, the infrared light source, the infrared receiver, and/or the flicker detection sensor. The opening(s) 251c may be positioned substantially in the opening area 281 and may thus be exposed to the outside of the housing 210 (e.g., through the rear plate 280). In some embodiments, the window frame 251 may include a plurality of openings 251c corresponding to each of the cameras 231, 232, and 233, the infrared light source, the infrared receiver, and/or the flicker detection sensor, and according to another embodiment, the window frame 251 may include one opening 251c. When the window frame 251 includes one opening 251c, the cameras 231, 232, and 233, the infrared light source, the infrared receiver, and/or the flicker detection sensor may receive light or emit optical signals to the outside through different areas of the opening 251c.

According to an embodiment, the window frame 251 may include a base plate 251a and a protrusion 251b. In some embodiments, the base plate 251a may refer to a flange extending in the X-axis direction or the Y-axis direction from the outer surface of the protrusion 251b. According to an embodiment, the protrusion 251b may protrude from one surface of the base plate 251a and may be formed to surround at least a portion of the opening 251c. In the illustrated embodiment, the protrusion 251b may be disposed on the base plate 251a and extend in the –Z-axis direction.

According to an embodiment, in the structure in which a plurality of openings 251c are provided, the openings 251c may be disposed in an area surrounded by the protrusion 251b. In an embodiment, the protrusion 251b may be adapted to define or surround one opening 251c. For example, the opening(s) 251c may be formed to pass through the window frame 251 and/or the base plate 251a in the area surrounded by the protrusion 251b. In another embodiment, when the base plate 251a is disposed on the rear plate 280 or the supporting member 211, the protrusion 251b may be at least partially disposed in the opening area 281 of the rear plate 280. For example, the protrusion 251b and/or the opening(s) 251c may be substantially exposed, so that they are part of the external appearance of the electronic device 200 or the housing 210.

According to an embodiment, the window 255 may be coupled to the window frame 251. In an embodiment, the window 255 may be disposed substantially on the protrusion 251b to close the opening(s) 251c and may be made of a substantially transparent material, such as a glass plate or a polymer plate, so that it can transmit light. For example, the window 255 may close the opening(s) 251c to isolate the internal space of the housing 210 from the exterior of the housing 210 and may provide an optical path for the cameras 231, 232, and 233, the infrared light source, the infrared receiver and/or the flicker detection sensor.

According to an embodiment, the electronic device 200 may further include a dummy plate 253 provided between the window frame 251 and the window 255. The dummy plate 253 may function as a bonding member for attaching the window 255 to the window frame 251. In another embodiment, the dummy plate 253 may be implemented as a decorative film, a deposition layer, a plating layer, a printed layer, and/or a painted layer disposed or formed in a designated area of the inner surface of the window 255, and it may provide a decorative effect. For example, according to an embodiment, at least a portion of the dummy plate 253 may correspond to a portion of the window 255, and the area corresponding to the opening(s) 251c may substantially transmit light, i.e., be transparent.

Figure 4:
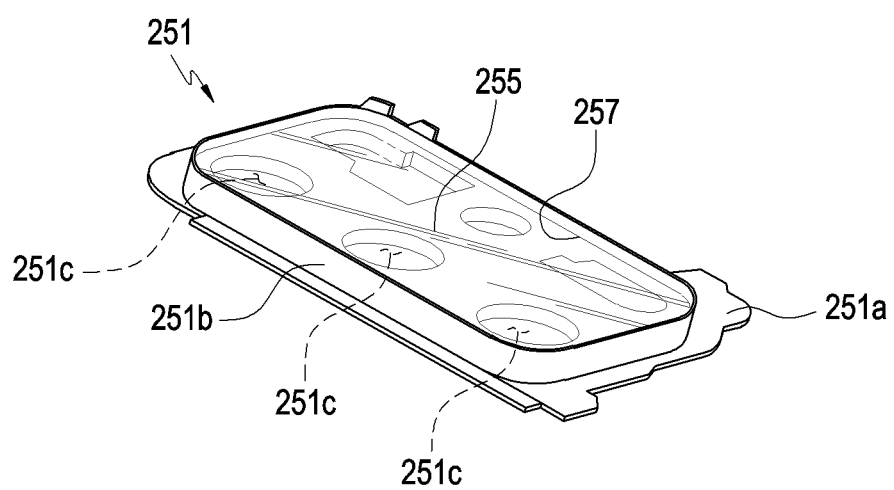
FIG. 4 is a perspective view illustrating a state in which a window is attached in an electronic device according to an embodiment of the disclosure.
Figure 5:
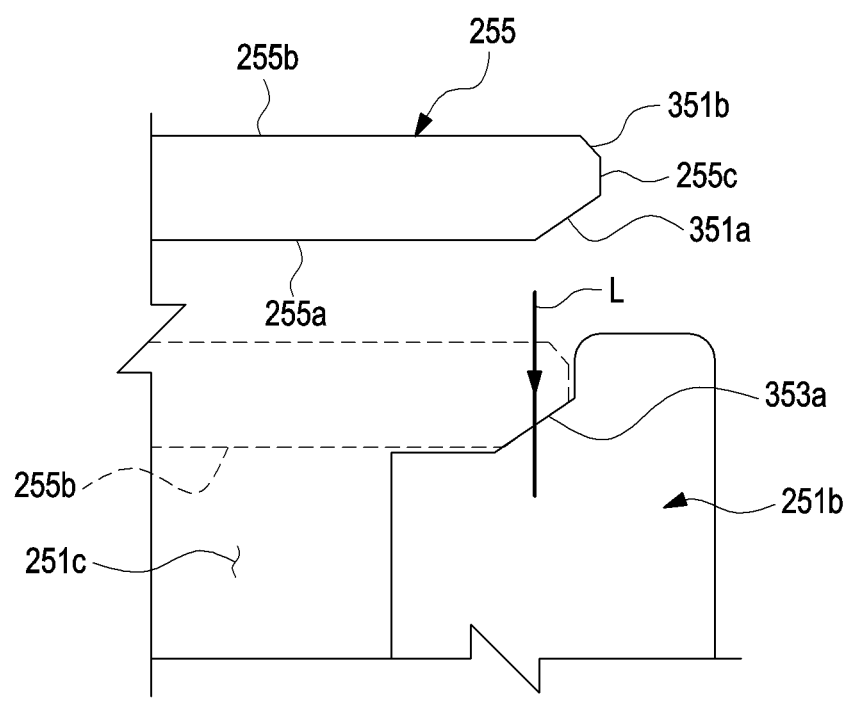
FIG. 5 is a cross-sectional view illustrating an operation for attaching a window in an electronic device according to one of various embodiments of the disclosure.

FIG. 4 is a perspective view illustrating a state in which a window 255 is attached in an electronic device (e.g., the electronic device 100 or 200 of FIGS. 1 to 3) according to an embodiment of the disclosure. FIG. 5 is a cross-sectional view illustrating an operation for attaching a window 255 in an electronic device 200 according to one of various embodiments of the disclosure.

Referring to FIGS. 4 and 5, the window 255 may be coupled to the window frame 251 by welding or fusion using laser L. For example, a fusion trajectory 257 may be formed along the edge of the window 255. The fusion trajectory 257 may substantially form a closed loop. The fusion trajectory 257 is formed on an inclined surface (e.g., first inclined surface 351a and second inclined surface 353a) that in turn is formed in a substantially closed loop. The inclined surfaces 351a and 353a may form a closed loop corresponding to the shape of the window 255. In this embodiment, although welding or fusion using laser (L) is disclosed to be used in attaching the window 255 to the window frame 251, various embodiments of the disclosure are not limited thereto, and as mentioned above, the window 255 may be coupled to the window frame 251 through the dummy plate 253, which is provided as a bonding member.

According to an embodiment, the window 255 may include an inner surface 255a facing the internal space of the housing (e.g., the housings 110 and 210 of FIGS. 1 to 3), an outer surface 255b facing in the opposite direction (e.g., the outer space of the housing 210) to the inner surface 255a, and/or a side surface 255c connecting the inner surface 255a and the outer surface 255b. In some embodiments, when the window 255 is made of a glass plate, it may be easily broken by external impact, due to the characteristics of glass. When the inner surface 255a and the side surface 255c or the outer surface 255b and the side surface 255c form a right angle or an acute angle where they meet, the corresponding edge portions may be more vulnerable to external impact. According to an embodiment, the vulnerability of the window 255 to external impact may be alleviated by configuring the surfaces to meet at obtuse angles. For example, as the first inclined surface 351a is formed between the inner surface 255a and the side surface 255c, the angles formed between the inner surface 255a and the side surface 255c may be two obtuse angles, as shown in FIG. 5. Similarly, as the window 255 includes an additional inclined surface 351b connecting the outer surface 255b and the side surface 255c, the vulnerability of the window 255 to external impact may be mitigated. According to an embodiment, the inclined surfaces 351a and 351b may be interpreted as part of the side surface 255c, and the side surface 255c may be disposed to face the inner wall of the opening 251c.

According to an embodiment, as disclosed above, to compensate for the vulnerability to external impact, the inner surface 255a, the outer surface 255b, and/or the side surface 255c may form the first inclined surface 351a or the additional inclined surface 351b. The first inclined surface 351a and the additional inclined surface 351b may each have a length of about 0.1 mm. Here, the "length of the first inclined surface 351a and the additional inclined surface 351b" may refer to the distance from the side surface 255c to the inner surface 255a or the outer surface 255b through the inclined surfaces 351a and 351b. In another embodiment, the fusion trajectory 257 of FIG. 4 may be positioned substantially corresponding to the first inclined surface 351a, e.g., positioned to intersect the first inclined surface 351a, as shown in FIG. 5. In this case, the first inclined surface 351a may be longer than the additional inclined surface 351b and may have a length of about 0.2-0.4 mm. The lengths of the inclined surfaces 351a and 351b may be suitably changed to compensate for the vulnerability to external impact or considering laser fusion to be described below.

According to an embodiment, the electronic device 200 or the window frame 251 may include a second inclined surface 353a corresponding to the first inclined surface 351a. The second inclined surface 353a may be, e.g., a portion of the inner wall of the opening 251c, and/or a portion of the inner surface of the protrusion 251b. In an embodiment, the second inclined surface 353a may extend obliquely with respect to another portion of the inner wall of the opening 251c and may be bonded or fused to the first inclined surface 351a. For example, if the window 255 is disposed on the window frame 251, the first inclined surface 351a may be disposed to substantially contact the second inclined surface 353a and, while a portion of the second inclined surface 353a is fused by irradiating the laser L and is then hardened, the window 255 may be bonded or fused to the window frame 251. Before irradiating the laser L, the window 255 may be temporarily fixed in a designated position on the window frame 251. For example, by limiting the movement of the window 255 and/or by pressing the window 255 to tightly contact the window frame 251 while the laser L is irradiated, displacement or deviation from the designed position may be prevented.

Figure 6:
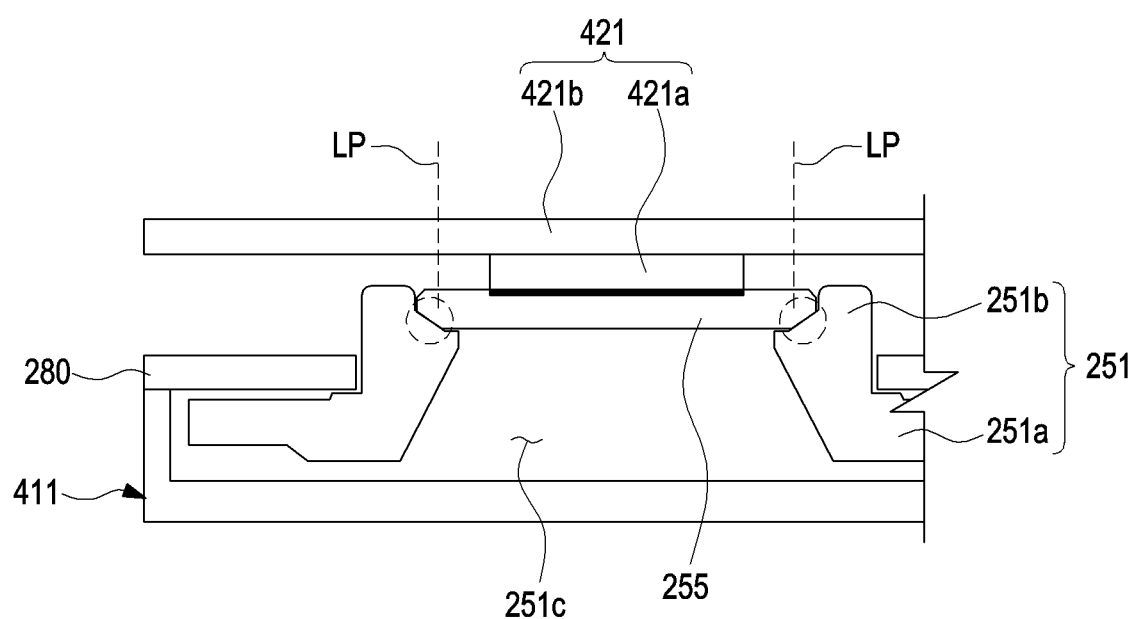
FIG. 6 is a cross-sectional view illustrating an example of an operation for attaching a window in an electronic device according to one of various embodiments of the disclosure.
Figure 7:
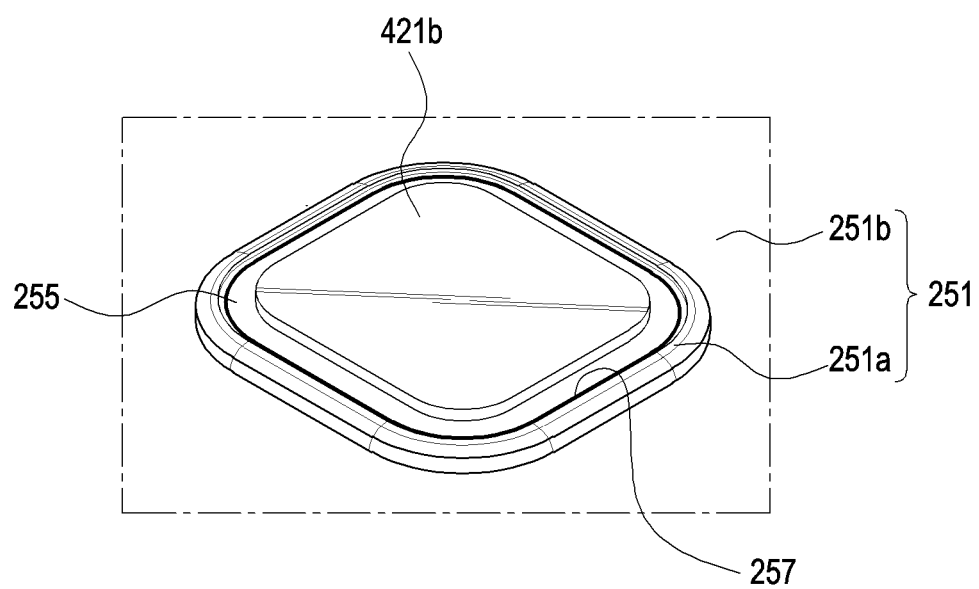
FIG. 7 is a perspective view illustrating a state in which the window of FIG. 6 is disposed in a window frame.

FIG. 6 is a cross-sectional view illustrating an example of an operation for attaching a window 255 in an electronic device (e.g., the electronic device 100 or 200 of FIGS. 1 to 3) according to one of various embodiments of the disclosure. FIG. 7 is a perspective view illustrating a state in which the window 255 of FIG. 6 is disposed in a window frame 251.

Referring to FIG. 6, the window 255 may be disposed on the window frame 251 while the window frame 251 and/or the rear plate 280 are disposed on a workbench 411. Before fusion, the window 255 may be securely placed in a designated position on the window frame 251 by the combination of the first inclined surface and the second inclined surface (e.g., the first inclined surface 351a and the second inclined surface 353a of FIG. 5) and the inclinations of these surfaces. In some embodiments, in the fusion operation, it is difficult to substantially predict the behavior of the molten resin or molten metal of the window frame 251, and the behavior of the molten resin or molten metal may distort or change the alignment position of the window 255.

According to an embodiment, while the laser is irradiated, the state in which the window 255 is fixed on the window frame 251 may be maintained by a pressing jig 421. The pressing jig 421 may include, e.g., a first pressing member 421a in direct contact with the window 255 and a second pressing member 421b that is transmissive to light (e.g., laser). The first pressing member 421a may be smaller in width or length than the window. The path LP along which the laser is irradiated may be positioned, corresponding to the edge (e.g., the first inclined surface 351a of FIG. 5) of the window 255 and/or the window frame 251 (e.g., the second inclined surface 353a of FIG. 5), in a position spaced apart from the outer edge of the first pressing member 421a. In an embodiment, the second pressing member 421b may have a width or length that is larger than those of the window 255 or the window frame 251 so that the second pressing member 421b extends to overlap with the rear plate 280 but may be made of a substantially transparent material or a material that transmits the laser. For example, by irradiating laser in a state in which the movement of the window 255 is restricted by the pressure jig 421, the window 255 may be stably fused or fixed in a designated position on the window frame 251.

According to an embodiment, when the window 255 is coupled with the window frame 251 by fusion, a near-infrared laser (e.g., having wavelength of about 0.75 µm to 1.5 µm) may be used. Considering the material (e.g., synthetic resin or metal) of the window frame 251, an appropriate output of laser in the range of about 50 w to 400 w may be irradiated to the fused portion. For example, the output value of the laser may be appropriately selected considering physical properties (e.g., melting point) of the material of the window frame 251. The diameter of the laser output from the irradiation device may be about 0.02 mm to 0.04 mm. When a laser beam with diameter of about 0.03 mm is irradiated, the diameter of the portion that reacts to heat in the window frame may be about 0.2 mm. The irradiated laser may substantially pass through the window 255 or the first inclined surface 351a and reach the second inclined surface 353a, thereby melting a portion of the second inclined surface 353a.

It should be noted that the numerical values used in the above-described embodiments, e.g., the numerical values related to the output or wavelength of the laser and the diameter of the irradiated laser, are not intended as limiting the disclosure. For example, the above-exemplified numerical value(s) may be varied depending on the material of the window frame 251, depending on the irradiation time or speed of the laser, and/or depending on the bonding strength required between the window 255 and the window frame 251.

According to an embodiment, the bonding strength between the window 255 and the window frame 251 may be enhanced by performing the fusion while being pressed with the pressing jig 421. For example, stronger bonding may be provided when the molten resin or molten metal of the window frame 251 are re-hardened after application of the laser. According to an embodiment, as revealed by tests, as compared with the structure bonded in the non-pressurized state, bonding while maintaining the pressed state enhances the bonding strength by about 1 kfg to 2 kfg. Other various components may be used to enhance the efficiency of laser fusion or the bonding strength. For example, at least a portion (e.g., the second inclined surface 353a) of the window frame may be manufactured in a matte, chromatic color to have a high laser absorption rate. If irregularities or hairlines are formed on the first inclined surface 351a after surface treatment, the first inclined surface 351a may provide a larger bonding area than it can be seen with the naked eye. In another embodiment, the bonding strength between the window 255 and the window frame 251 may be enhanced by the laser irradiation pattern or trajectory, and relevant embodiments are described below with reference to FIGS. 10 to 13.

Figure 8:
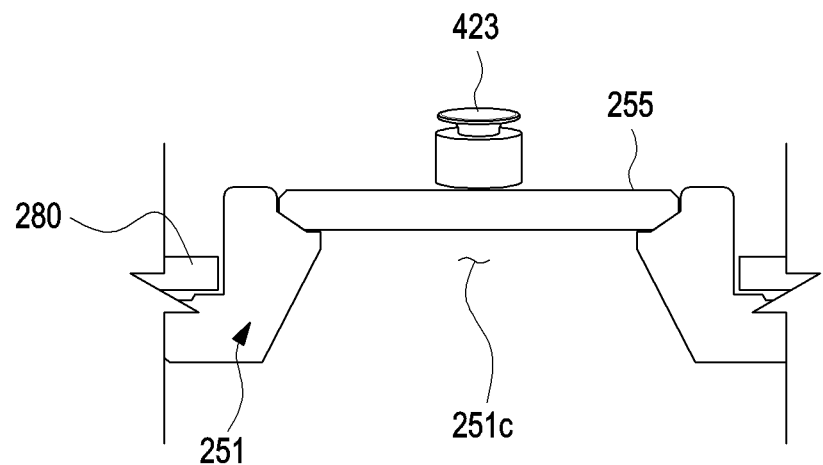
FIG. 8 is a cross-sectional view illustrating another example of an operation for attaching a window in an electronic device according to one of various embodiments of the disclosure.
Figure 9:
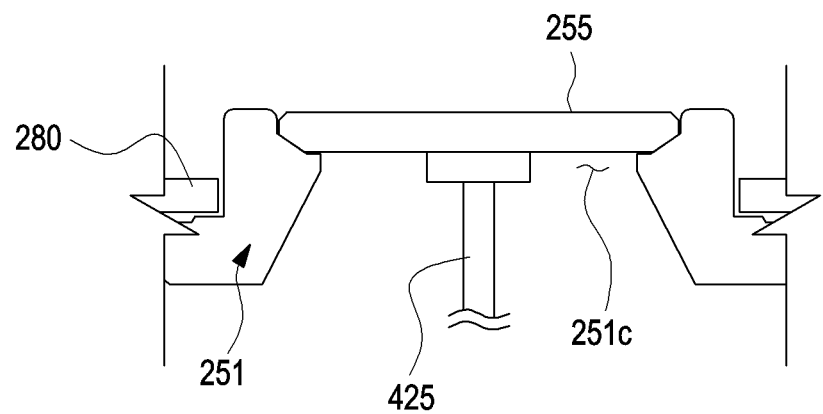
FIG. 9 is a cross-sectional view illustrating another example of an operation for attaching a window in an electronic device according to one of various embodiments of the disclosure.

FIG. 8 is a cross-sectional view illustrating another example of an operation for attaching a window 255 in an electronic device (e.g., the electronic device 100 or 200 of FIGS. 1 to 3) according to one of various embodiments of the disclosure. FIG. 9 is a cross-sectional view illustrating still another example of an operation for attaching a window 255 in an electronic device 200 according to one of various embodiments of the disclosure.

In the operation of irradiating the laser, it should be noted that although in the above-described embodiments, the pressing jig 421 is used in restricting the movement of the window 255, the disclosure are not limited thereto. For example, a weight 423 of FIG. 8 or suction cup 425 of FIG. 9 may be utilized. The weight of the weight 423 or the suction force of the suction cup 425 may be appropriately selected based on how much the movement of the window 255 should be restricted when molten resin or molten metal are created by the laser.

FIGS. 10 to 13 are views illustrating patterns in which a window 255 is fused to a window frame 251 in an electronic device (e.g., the electronic device 100 or 200 of FIGS. 1 to 3) according to certain embodiments of the disclosure.

FIGS. 10 to 13 are enlarged views of a portion of, e.g., a fusion trajectory (e.g., the fusion trajectory 257 of FIG. 4). When the fusion trajectory 257 is seen with the naked eye, it can be seen as straight line(s) or curve(s) forming a closed loop along the edge of the window 255. However, when enlarged, the fusion trajectory 257 may include various patterns. In embodiments, the pattern of FIGS. 10 to 13, as seen by partially enlarging the fusion trajectory 257, is the irradiation pattern of the laser and may include at least one of the line-type pattern 257a of FIG. 10, the zigzag pattern 257b of FIG. 11, the wobble pattern 257c of FIG. 12, and/or the sine pattern 257d of FIG. 13. In an embodiment, if laser is irradiated with the line-type pattern 257a of FIG. 10, a plurality of laser beams are irradiated simultaneously or in parallel at designated intervals, or one laser beam may be irradiated repeatedly a designated number of times, so that a fusion trajectory composed of a plurality of laser irradiated lines may be formed. According to an embodiment, as the fusion area increases, the bonding strength between the window 255 and the window frame 251 may increase. For example, upon considering the bonding strength between the window 255 and the window frame 251, various laser irradiation patterns or numbers of times of irradiation may be selected. In another embodiment, since the window 255 is substantially transparent, even if the fusion trajectory 257 is positioned on the inner surface of the window 255, it may be visible through the window 255 from the outside of the window 255. For example, given that the fusion trajectory 257 is visible and is part of the external appearance of the electronic device 200 or the housing (e.g., the housing 110 or 210 of FIGS. 1 to 3), the laser irradiation pattern or the number of times of irradiation may be appropriately selected.

Figure 14:
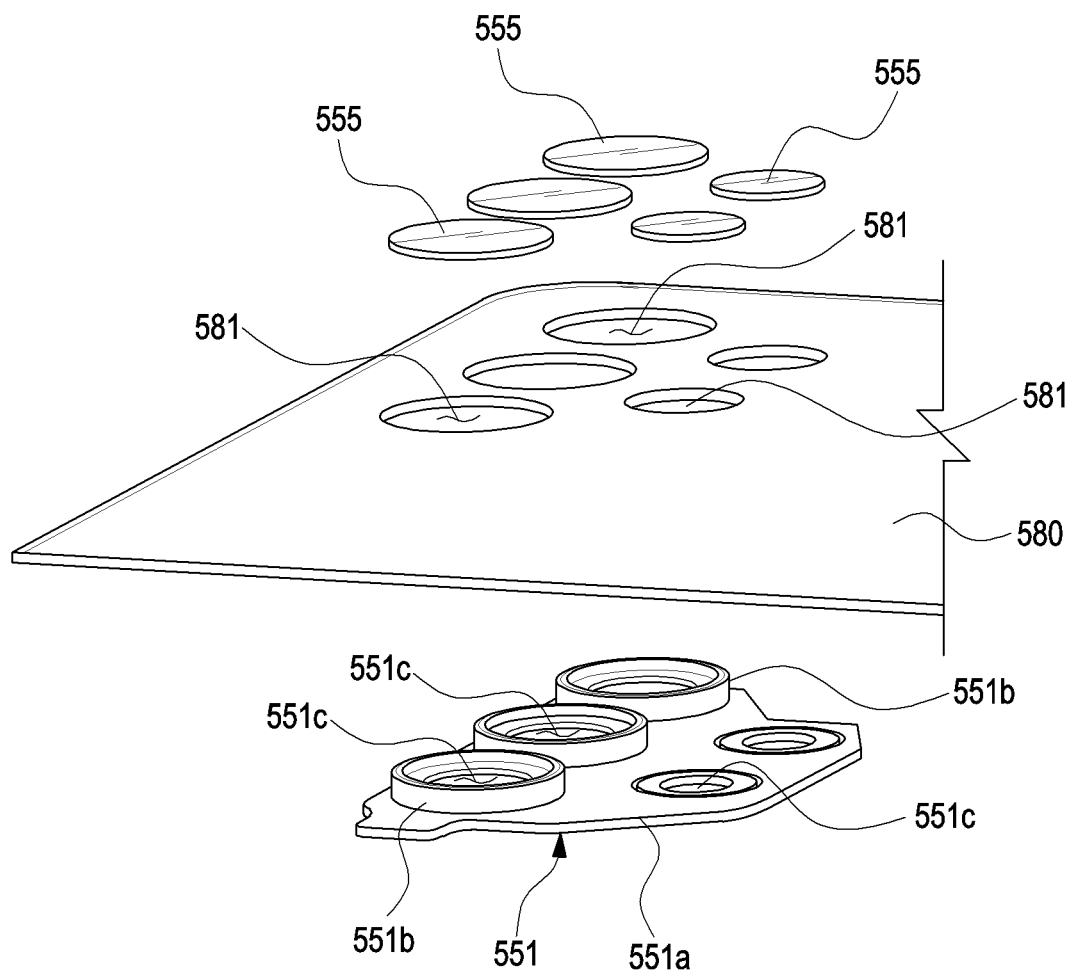
FIG. 14 is an exploded perspective view illustrating a portion of an electronic device according to another one of various embodiments of the disclosure.
Figure 15:
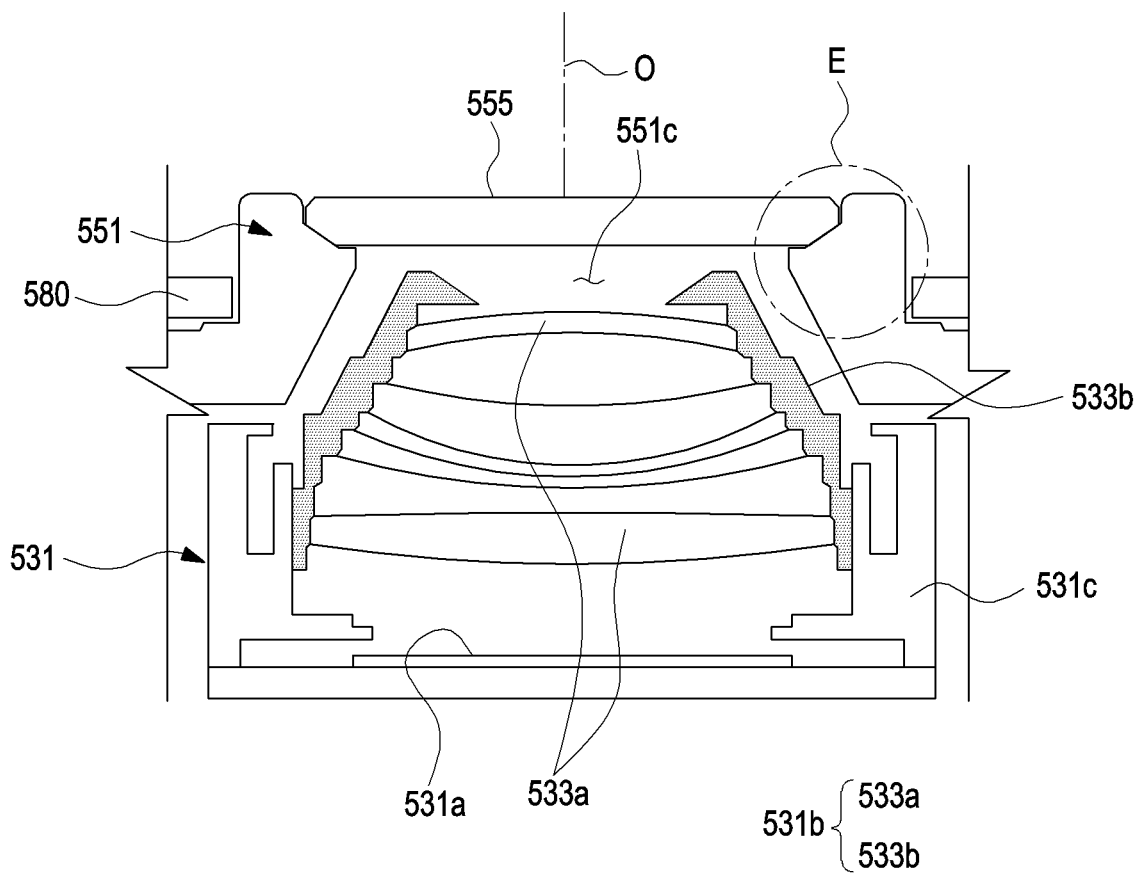
FIG. 15 is a cross-sectional view illustrating an example in which a window is attached in an electronic device according to another one of various embodiments of the disclosure.
Figure 16:
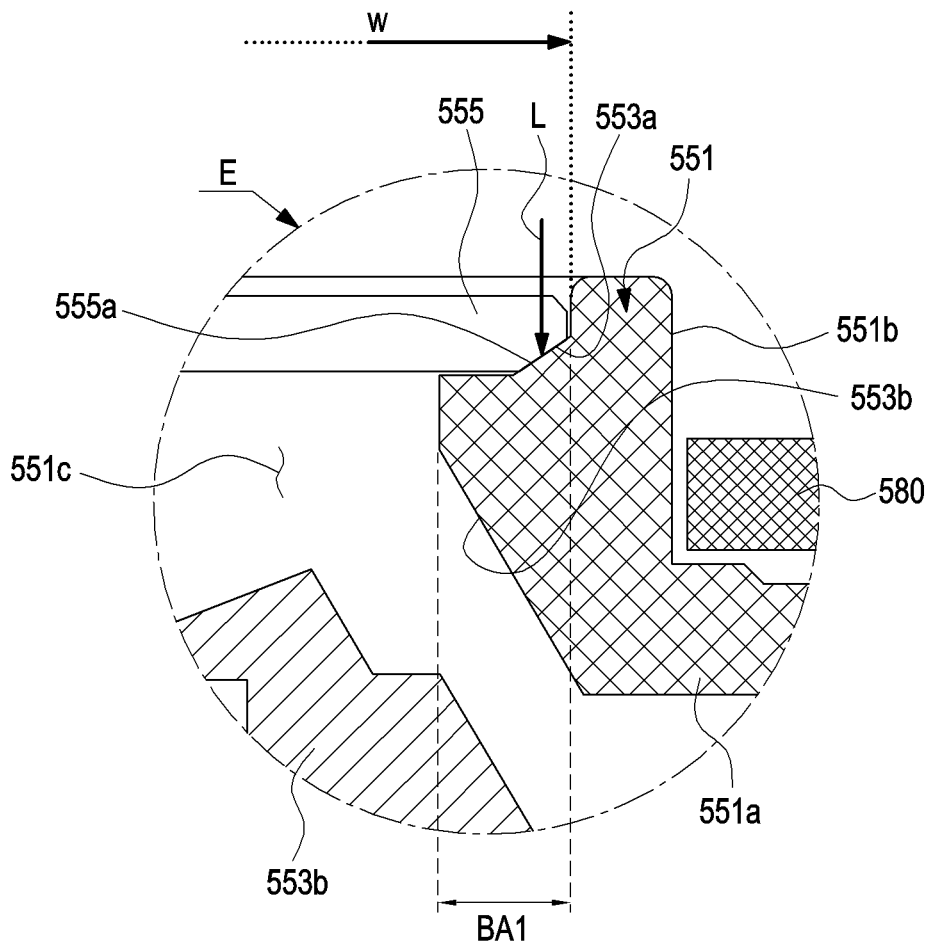
FIG. 16 is an enlarged view illustrating portion 'E' of FIG. 15.

FIG. 14 is an exploded perspective view illustrating a portion of an electronic device (e.g., the electronic device 100 or 200 of FIGS. 1 to 3) according to another one of various embodiments of the disclosure. FIG. 15 is a cross-sectional view illustrating a state in which a window 555 is attached in an electronic device according to another one of various embodiments of the disclosure. FIG. 16 is an enlarged view illustrating portion 'E' of FIG. 15.

Referring to FIGS. 14 to 16, an electronic device 200 may include a plurality of openings 551c and windows 555 corresponding to each of the openings 551c. In an embodiment, the window frame 551 may include a plurality of protrusions 551b. At least some of the openings 551c may be surrounded by the protrusions 551b. For example, some of the opening(s) 551 may be formed to pass through the base plate 551a in an area surrounded by one of the protrusions 551b. In some embodiments, the rear plate 580 may include opening areas 581 corresponding to each protrusion 551b or opening 551c. The protrusions 551b or the openings 551c may be disposed correspond to one of the opening areas 581.

According to an embodiment, the window frame 551 may be coupled to the rear plate 580, with the base plate 551a facing the inner surface of the rear plate 580. If the window frame 551 is coupled to the rear plate 580, the protrusion 551b may be received in the opening areas 581. In some embodiments, some of the openings 551c may be formed to pass through the base plate 551a in areas with no protrusion 551b and may be placed in alignment with one or more of the opening areas 581. In an embodiment, the windows 555 may have a shape corresponding to the openings 551c and may be coupled to the window frame 551 to close the openings 551c. In some embodiments, the window 555 may be coupled to the inner surface of the protrusions 551b. The first inclined surface 555a (e.g., the first inclined surface 351a of FIG. 5) of the window 555 and the second inclined surface 553a (e.g., the second inclined surface 353a of FIG. 5) formed on the inner wall of the protrusion 551b may be fused by laser. The placement structure of the window 555 has been described above in connection with the foregoing embodiments, and no further detailed description thereof is given below.

According to an embodiment, in the area where the second inclined surface 553a is formed, the width w of the opening 551c may gradually decrease in a direction from the outside of the housing (e.g., the housing 210 of FIG. 3) or the rear plate 580 to the inside. For example, the window 555 may be disposed on the window frame 551, and as the second inclined surface 553a contacts the first inclined surface 555a, the placement or bonding position of the window 555 may be determined. In some embodiments, the electronic device (e.g., the electronic device 100 or 200 of FIGS. 1 to 3) or the window frame 551 may further include a third inclined surface 553b extending from the second inclined surface 553a. The third inclined surface 553b may be positioned further inward of the housing 210 or the rear plate 580 than the second inclined surface 553a. According to an embodiment, in the area where the third inclined surface 553b is formed, the width w of the opening 551c may gradually increase in a direction from the outside of the housing (e.g., the housing 210 of FIG. 3) or the rear plate 580 to the inside.

According to an embodiment, the difference between the area through which light may be transmitted to the inside of the window frame 551 and the total area or size provided by the window 555 may be exclusively for the bonding area of the window 555 and the window frame 551. For example, the total area or size provided by the window 555 may be defined as the sum of the area through which light may be transmitted and the bonding width BA1. It has been previously mentioned that as the bonding width BA1 increases, the designer's ability to design the appearance of the electronic device (e.g., the electronic device 100 or 200 of FIGS. 1 to 3) decreases. According to certain embodiments of the disclosure, as the window 555 and the window frame 551 are irradiated with laser L, the first inclined surface 555a and the second inclined surface 553a may be bonded and, it has been identified that when the bonding width BA1 is about 0.4 mm to 0.5 mm, the bonding strength of about 4 kgf to about 5 kgf may be provided between the window 555 and the window frame 551. In some embodiments, the portion where the laser is actually irradiated or where the fusion is performed may be smaller than the bonding width BA1 of FIG. 16.

According to an embodiment, the camera 531 (e.g., any one of the cameras 231, 232, and 233 of FIG. 3) may include a lens assembly 531b including at least one lens 533a and an image sensor 531a aligned with the lens assembly 531b along the optical axis O. For example, the camera 531 may receive external light incident through the window 555 and/or the lens assembly 531b. In the present embodiment, although the camera 531 is exemplified as an electronic component corresponding to the opening 551c or the window 555, it should be noted that an optical module, such as an infrared light source, an infrared receiver, and/or a flicker detection sensor, may be disposed corresponding to any one of the openings 551c. In an embodiment, the lens assembly 531b may include, e.g., a barrel 533b and a plurality of lenses 533a disposed in the barrel 533b and may be disposed to face the inner surface of the window 555. The opening 551c or window 555 may be aligned on the optical axis O with the lens assembly 531b and/or the image sensor 531a. For example, the image sensor 531a may receive the light, which is sequentially transmitted through the window 555 and the lens assembly 531b and incident, and convert it into an electrical signal. According to an embodiment, the lens assembly 531b may be coupled with the image sensor 531a through a casing 531c, and it may move forward and backward in the direction of the optical axis O on the casing 531c.

Figure 17:
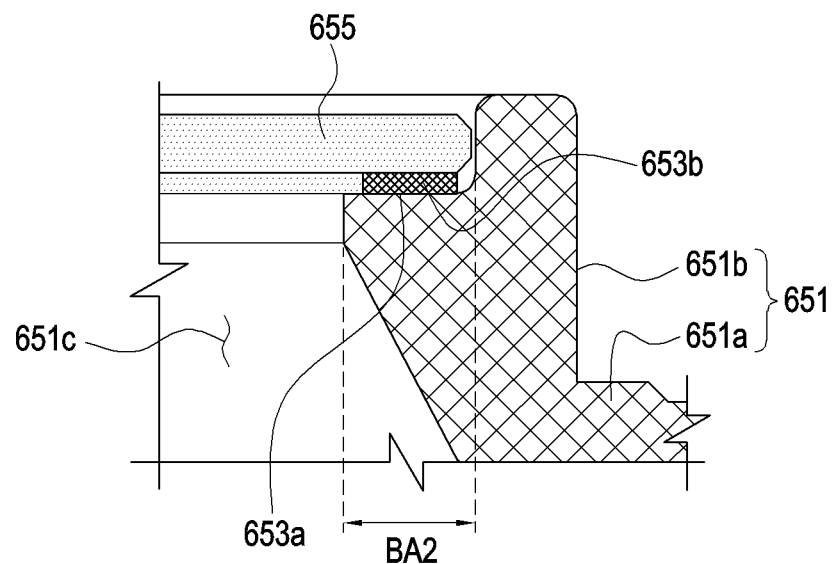
FIG. 17 is a cross-sectional view illustrating a state in which a window is attached in a conventional electronic device.

FIG. 17 is a cross-sectional view illustrating a state in which a window 655 is attached in a conventional electronic device.

An adhesive or adhesive tape 653b may be used to couple the window 655 to the window frame 651. Referring to FIG. 17, the window frame 651 may include a base plate 651a, a protrusion 651b protruding from one surface of the base plate 651a, and a stepped surface 653a formed on the inner surface of the protrusion 651b. The stepped surface 653a may be disposed to substantially face the inner surface of the window 655, and the adhesive tape 653b may bond the edge of the window 655 to the stepped surface 653a.

The adhesive tape 653b may be manufactured by cutting an adhesive fabric into the shape and size corresponding to the window 655. In the cutting operation, the minimum width of the adhesive tape 653b may be required to be about 0.8 mm. Furthermore, considering manufacturing errors that may occur in the cutting process, or alignment errors that may occur in the process of attaching the adhesive tape 653b to the window 655 or the window frame 651 (e.g., the stepped surface 653a), the bonding width BA2 of about 0.9 to 1.2 mm may be needed to secure the window frame 651. In some embodiments, the window 655 may be attached to the window frame 651 using an adhesive that replaces the adhesive tape 653b. However, the window 655 may be contaminated by the adhesive in the area corresponding to the opening 651c (or the area through which light passes). Therefore, the coupling structure using an adhesive may require considerable care or an additional structure to prevent contamination of the window 655.

Comparing the embodiment of FIG. 16 to the conventional art shown in FIG. 17, as compared to the coupling structure using the adhesive tape 653b or the adhesive, the bonding structure using laser fusion (e.g., the coupling structure of FIG. 5 or FIG. 16) may decrease the bonding width BA1 or BA2 by about 0.4 to 0.8 mm and may enhance the designer's ability to design the appearance of the electronic device (e.g., the electronic device 100 or 200 of FIGS. 1 to 3). Conventionally, the bonding structure using the adhesive tape 653b may have significant deviation in bonding strength depending on the bonding environment or time or the temperature in an actual use environment. Although the maximum bonding strength is about 5 kgf, the bonding strength may be decreased up to 2.8 kgf depending on the environment at the time of bonding or the temperature in the actual use environment. According to certain embodiments, the coupling structure of the window 255 or 555 and the window frame 251 or 551 using laser fusion may maintain a bonding strength of about 4 to 5 kgf as the deviation according to the bonding environment or use environment is mitigated. As such, in certain embodiments of the disclosure, as laser fusion is used in coupling the window 255 or 555 to the window frame 251 or 551, the bonding width is reduced, and the designer's ability to design the appearance of the electronic device is enhanced. Thus, it is possible to mitigate the deviation in bonding strength or decrease in bonding strength between the structures (e.g., the window 255 or 555 and the window frame 251 or 551).

Figure 18:
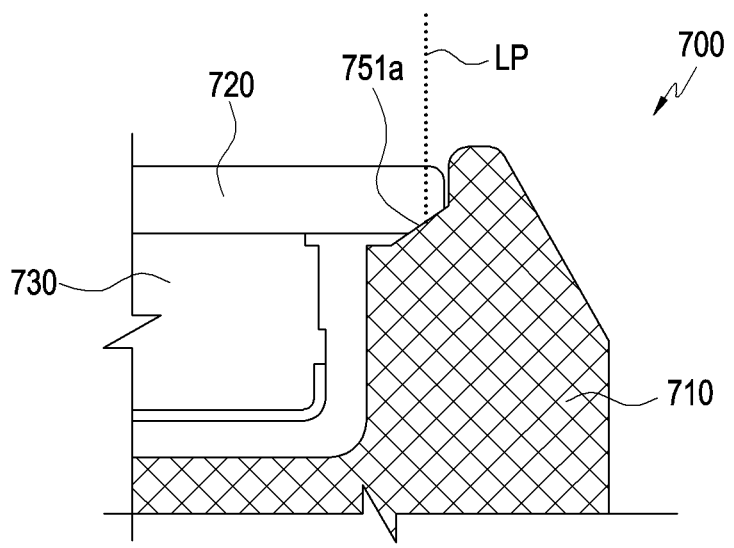
FIG. 18 is a cross-sectional view illustrating an example in which a window is attached in an electronic device according to still another one of various embodiments of the disclosure.

FIG. 18 is a cross-sectional view illustrating an example in which a window 720 (e.g., the front plate 102 or 220 of FIG. 1 or 3) is attached in an electronic device 700 (e.g., the electronic device 100 or 200 of FIGS. 1 to 3) according to another one of various embodiments of the disclosure.

Exemplified in the embodiment described above is a configuration in which the window (e.g., the window 255 or 555 of FIG. 5 or FIG. 16) is disposed corresponding to the camera (e.g., the camera 231, 232, 233, or 531 of FIG. 3 or 15). However, the disclosure are not limited thereto, and laser fusion may be used in coupling a window for a display (e.g., the display 101 or 230 of FIG. 1 or 3) of a portable electronic device, e.g., smartphone or wearable electronic device, to another structure (e.g., the housing 110 or 210 of FIGS. 1 to 3).

Referring to FIG. 18, the display 730 of the electronic device 700 may be substantially disposed on the inner surface of the window 720 (e.g., the front plate 102 or 220 of FIG. 1 or FIG. 3) and may output screens through a significant portion of the window 720. The window 720 may include a first inclined surface 751a formed on an inside edge, and the first inclined surface 751a may be substantially positioned on the incident path LP of the laser used in the fusion or bonding operation. Although assigned no reference number, the electronic device 700 may include a second inclined surface formed on the inner wall of the housing 710, and the window 720 may be disposed on the housing 710, with the first inclined surface 751a in contact with the second inclined surface. If laser is irradiated through the incident path LP with the first inclined surface 751a in contact with the second inclined surface, a portion of the housing 710 (e.g., the second inclined surface) may be melted and hardened so that the window 720 may be bonded or fused to the housing 710.

Figure 19:
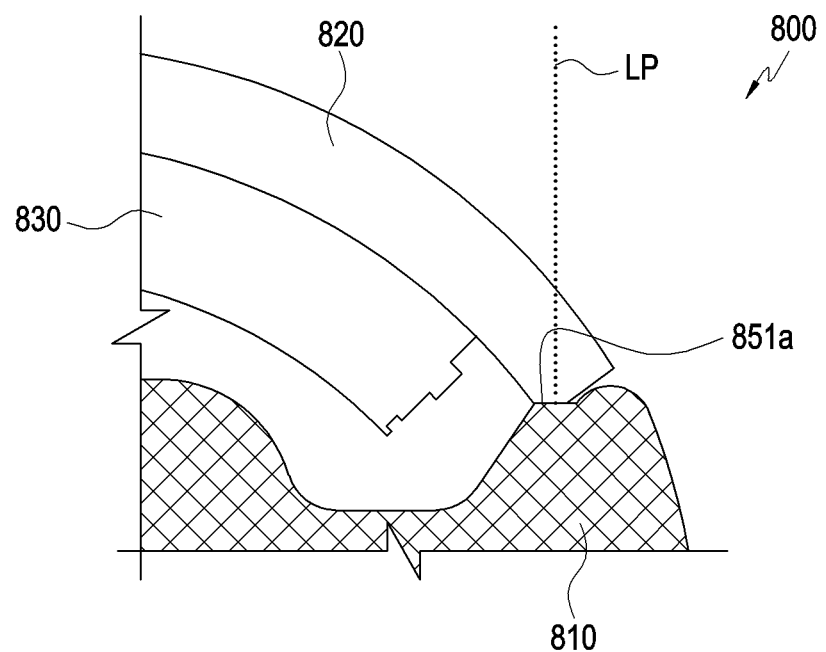
FIG. 19 is a cross-sectional view illustrating an example in which a window is attached in an electronic device according to still another one of various embodiments of the disclosure.

FIG. 19 is a cross-sectional view illustrating an example in which a window 820 (e.g., the front plate 102 or 220 of FIG. 1 or 3) is attached in an electronic device 800 (e.g., the electronic device 100 or 200 of FIGS. 1 to 3) according to another one of various embodiments of the disclosure.

Referring to FIG. 19, a portion of the display 830 or the window 820 (e.g., the front plate 102 or 220 of FIG. 1 or 3) may be formed to have a curved surface, and a portion of the edge of the window 820 may be provided as the bonding surface 851a (e.g., the first inclined surface 351a of FIG. 5) and be disposed to contact the housing 810. In an embodiment, the bonding surface 851a is positioned on the incident path LP of the laser and, as a portion of the housing 810 is molten and hardened by laser irradiations, the window 820 may be bonded to the housing 810.

Figure 20:
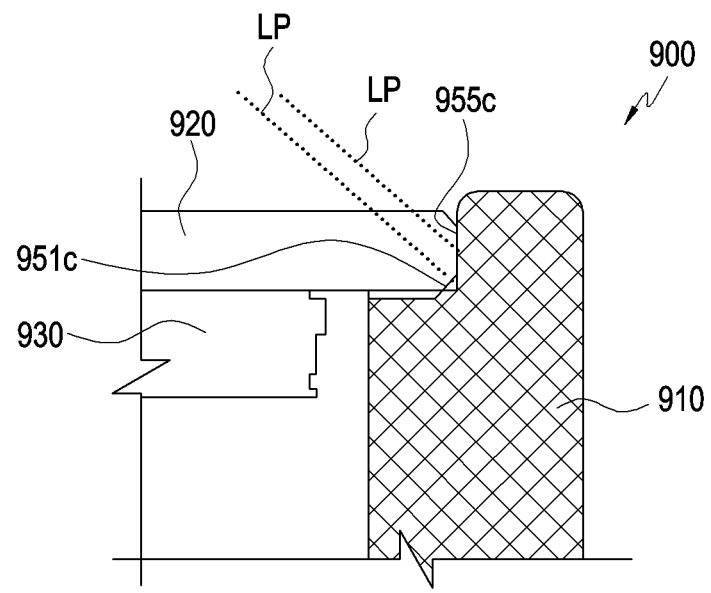
FIG. 20 is a cross-sectional view illustrating an example in which a window is attached in an electronic device according to still another one of various embodiments of the disclosure.

FIG. 20 is a cross-sectional view illustrating an example in which a window 920 (e.g., the front plate 102 or 220 of FIG. 1 or 3) is attached in an electronic device 900 (e.g., the electronic device 100 or 200 of FIGS. 1 to 3) according to another one of various embodiments of the disclosure.

Referring to FIG. 20, in the window 920 (e.g., the front plate 102 or 220 of FIG. 1 or 3) where the display 930 is disposed on the inner side, the side surface 955c and/or the first inclined surface 951c may contact or bond to the inner wall or inclined surface of the housing 910. As mentioned above, the first inclined surface 951c may be inclined with respect to the side surface 955c and, in this case, the laser may be incident through two paths LP parallel to or crossing each other to melt a portion of the housing 910, so that the side surface 955c of the window 920 and the first inclined surface 951c may be fused to the housing 910.

According to an embodiment of the disclosure, an electronic device (e.g., the electronic device 100 or 200 of FIGS. 1 to 3) may comprise a housing (e.g., the housing 110 or 210 of FIGS. 1 to 3), a window frame (e.g., the window frame 251 or 551 of FIGS. 3 to 5 and/or FIGS. 14 to 16) disposed in the housing and providing at least one opening (e.g., the opening 251c or 551c of FIGS. 3 to 5 and/or FIGS. 14 to 16) exposing an inside of the housing to an outside of the housing, at least one window (e.g., the window 255 or 555 of FIGS. 3 to 5 and/or FIGS. 14 to 16) coupled to the window frame to close the at least one opening, and at least one optical module (e.g., the camera 231, 232, 233, or 531 of FIG. 3 or 15) disposed inside the housing and configured to receive external light incident through the at least one window. The at least one window may include an inner surface (e.g., the inner surface 255a of FIG. 5) facing the inside of the housing, a side surface (e.g., the inner surface 255a of FIG. 5) facing an inner wall of the at least one opening, and a first inclined surface (e.g., the first inclined surface 351a of FIG. 5) connecting the side surface to the inner surface. The first inclined surface may be inclined with respect to the inner surface and the side surface and may be bonded to the inner wall.

According to an embodiment, the window frame may include a second inclined surface (e.g., the second inclined surface 353a of FIG. 5) formed as a portion of the inner wall. The second inclined surface may extend obliquely with respect to another portion of the inner wall and may be at least partially bonded to the first inclined surface.

According to an embodiment, the window frame may include a second inclined surface formed as a portion of the inner wall. The second inclined surface may extend obliquely with respect to another portion of the inner wall and may be at least partially fused (e.g., fusion by laser L of FIG. 5) with the first inclined surface.

According to an embodiment, a width (e.g., the width w of FIG. 16) of the at least one opening may decrease in a direction from the outside of the housing to the inside in an area where the second inclined surface is formed.

According to an embodiment, a trajectory (e.g., the fusion trajectory 257 of FIG. 4) of the fusion between the first inclined surface and the second inclined surface may form a closed loop along an edge of the at least one window.

According to an embodiment, the first inclined surface and the second inclined surface may be fused in at least one pattern (e.g., the laser irradiated pattern of FIGS. 10 to 13) of a line-type pattern, a wobble pattern, a zigzag pattern, or a sine pattern.

According to an embodiment, the window frame may further include a third inclined surface (e.g., the third inclined surface 553b of FIG. 16) extending from the second inclined surface. The third inclined surface may be disposed further inward of the housing than the second inclined surface. A width of the at least one opening may increase in a direction from the outside of the housing to the inside in an area where the third inclined surface is formed.

According to an embodiment, the at least one optical module may include a lens assembly (e.g., the lens assembly 531b of FIG. 15) including at least one lens (e.g., the lens 533a of FIG. 15) and disposed to face the inner surface of the at least one window and an image sensor (e.g., the image sensor 531a of FIG. 15) disposed to face the inner surface of the at least one window with the at least one lens interposed therebetween.

According to an embodiment, the window frame may include a second inclined surface formed as a portion of the inner wall and at least partially fused to the first inclined surface and a third inclined surface extending from the second inclined surface and disposed further inward of the housing than the second inclined surface. A width of the at least one opening may decrease in a direction from the outside of the housing to the inside in an area where the second inclined surface is formed. The width of the at least one opening may increase in the direction from the outside of the housing to the inside in an area where the third inclined surface is formed.

According to an embodiment, a trajectory of the fusion between the first inclined surface and the second inclined surface may include at least one pattern of a line-type pattern, a wobble pattern, a zigzag pattern, or a sine pattern and form a closed loop along an edge of the at least one window.

According to an embodiment, the window frame may include a base plate (e.g., the base plate 251a or 551a of FIG. 4 or 14) coupled to an inner surface of the housing and a protrusion (e.g., the protrusion 251b or 551b of FIG. 4 or 14) protruding from one surface of the base plate and formed to surround at least a portion of the at least one opening. The at least one opening may be formed to pass through the base plate in an area surrounded by the protrusion.

According to an embodiment, the window frame may further include a second inclined surface forming a closed loop on an inner surface of the protrusion. The second inclined surface may be at least partially fused with the first inclined surface.

According to an embodiment, the closed loop may be along an edge of the at least one window.

According to an embodiment, the window frame may be configured to provide a plurality of openings.

According to an embodiment, the first inclined surface may be configured to at least partially transmit light incident from the outside of the housing.

According to an embodiment, during fusion, the at least one window may be secured onto the window frame by a pressing jig, weight, and/or suction cup.

According to an embodiment of the disclosure, an electronic device (e.g., the electronic device 100 or 200 of FIGS. 1 to 3) may comprise a housing (e.g., the housing 110 or 210 of FIGS. 1 to 3), a display (e.g., the display 101, 230, 730, 830, or 930 of FIGS. 1, 3, and/or 18 to 20) disposed on a first surface of the housing, a window frame (e.g., the window frame 251 or 551 of FIGS. 3 to 5 and/or FIGS. 14 to 16) disposed in the housing and providing at least one opening (e.g., the opening 251c or 551c of FIGS. 3 to 5 and/or FIGS. 14 to 16) exposed to a second surface of the housing, at least one window (e.g., the window 255 or 555 of FIGS. 3 to 5 and/or FIGS. 14 to 16) coupled to the window frame to close the at least one opening, and at least one optical module (e.g., the camera 231, 232, 233, or 531 of FIG. 3 or 15) disposed inside the housing and configured to receive external light incident through the at least one window. The at least one window may include an inner surface (e.g., the inner surface 255a of FIG. 5) facing an inside of the housing, a side surface (e.g., the inner surface 255a of FIG. 5) facing an inner wall of the at least one opening, and a first inclined surface (e.g., the first inclined surface 351a of FIG. 5)

connecting the side surface to the inner surface. The window frame may include a second inclined surface (e.g., the second inclined surface 353a of FIG. 5) formed as a portion of the inner wall. The second inclined surface may be at least partially fused to the first inclined surface.

According to an embodiment, a width (e.g., the width w of FIG. 16) of the at least one opening may decrease in a direction from the outside of the housing to an inside in an area where the second inclined surface is formed.

According to an embodiment, a trajectory (e.g., the fusion trajectory 257 of FIG. 4) of the fusion between the first inclined surface and the second inclined surface may form a closed loop along an edge of the at least one window.

According to an embodiment, the window frame may include a base plate (e.g., the base plate 251a or 551a of FIG. 4 or 14) coupled to an inner surface of the housing and a protrusion (e.g., the protrusion 251b or 551b of FIG. 4 or 14) protruding from one surface of the base plate and formed to surround at least a portion of the at least one opening. The at least one opening may be formed to pass through the base plate in an area surrounded by the protrusion.

According to an embodiment, the second inclined surface may be formed on an inner surface of the protrusion.

While the disclosure has been shown and described with reference to exemplary embodiments thereof, it will be apparent to those of ordinary skill in the art that various changes in form and detail may be made thereto without departing from the spirit and scope of the disclosure as defined by the following claims. For example, although in the above-described embodiments, as examples, the camera (s) (e.g., the camera 231, 232, 233, or 531 of FIG. 3 or 15) is the optical module disposed corresponding to the window (e.g., the window 255 or 555 of FIGS. 3 to 5 and/or FIGS. 14 to 16), the optical module disposed corresponding to the window may further include an infrared light source, an infrared receiver, a flicker detection sensor, a proximity sensor, an HRM sensor, and/or a fingerprint sensor.

What is claimed is:

1. An electronic device, comprising:
   a housing;
   a window frame disposed in the housing and providing at least one opening exposing an inside of the housing to an outside of the housing;
   at least one window coupled to the window frame to close the at least one opening; and
   at least one optical module disposed inside the housing and configured to receive external light incident through the at least one window,
   wherein the at least one window includes an inner surface facing the inside of the housing, a side surface facing an inner wall of the at least one opening, and a first inclined surface connecting the side surface to the inner surface, and
   wherein the first inclined surface is inclined with respect to the inner surface and the side surface and is bonded to the inner wall.

2. The electronic device of claim 1, wherein the window frame includes a second inclined surface formed as a portion of the inner wall, and
   wherein the second inclined surface extends obliquely with respect to another portion of the inner wall and is at least partially bonded to the first inclined surface.

3. The electronic device of claim 1, wherein the window frame includes a second inclined surface formed as a portion of the inner wall, and
   wherein the second inclined surface extends obliquely with respect to another portion of the inner wall and is at least partially fused with the first inclined surface.

4. The electronic device of claim 3, wherein a width of the at least one opening decreases in a direction from the outside of the housing to the inside in an area where the second inclined surface is formed.

5. The electronic device of claim 3, wherein a trajectory of fusion between the first inclined surface and the second inclined surface forms a closed loop along an edge of the at least one window.

6. The electronic device of claim 3, wherein the first inclined surface and the second inclined surface are fused in a line-type pattern, a wobble pattern, a zigzag pattern, and/or a sine pattern.

7. The electronic device of claim 3, wherein the window frame further includes a third inclined surface extending from the second inclined surface,
   wherein the third inclined surface is disposed further inward of the housing than the second inclined surface, and wherein a width of the at least one opening increases in a direction from the outside of the housing to the inside in an area where the third inclined surface is formed.

8. The electronic device of claim 1, wherein the at least one optical module includes:
   a lens assembly including at least one lens and disposed to face the inner surface of the at least one window; and
   an image sensor disposed to face the inner surface of the at least one window with the at least one lens interposed therebetween.

9. The electronic device of claim 8, wherein the window frame includes:
   a second inclined surface formed as a portion of the inner wall and at least partially fused to the first inclined surface; and
   a third inclined surface extending from the second inclined surface and disposed further inward of the housing than the second inclined surface,
   wherein a width of the at least one opening decreases in a direction from the outside of the housing to the inside in an area where the second inclined surface is formed, and
   wherein the width of the at least one opening increases in the direction from the outside of the housing to the inside in an area where the third inclined surface is formed.

10. The electronic device of claim 9, wherein a trajectory of fusion between the first inclined surface and the second inclined surface includes a line-type pattern, a wobble pattern, a zigzag pattern, and/or a sine pattern and forms a closed loop along an edge of the at least one window.

11. The electronic device of claim 1, wherein the window frame includes:
    a base plate coupled to an inner surface of the housing; and
    a protrusion protruding from one surface of the base plate and formed to surround at least a portion of the at least one opening,
    wherein the at least one opening is formed to pass through the base plate in an area surrounded by the protrusion.

12. The electronic device of claim 11, wherein the window frame further includes a second inclined surface forming a closed loop on an inner surface of the protrusion, and
    wherein the second inclined surface is at least partially fused with the first inclined surface.

13. The electronic device of claim 12, wherein the closed loop is along an edge of the at least one window.

14. The electronic device of claim 1, wherein the window frame is configured to provide a plurality of openings.

15. The electronic device of claim 1, wherein the first inclined surface is configured to at least partially transmit light incident from the outside of the housing.

16. The electronic device of claim 1, wherein the window frame includes a second inclined surface formed as a portion of the inner wall,
- wherein the second inclined surface extends obliquely with respect to another portion of the inner wall and is at least partially fused with the first inclined surface, and
- wherein during fusion, the at least one window is secured onto the window frame by a pressing jig, weight, and/or suction cup.

\* \* \* \* \*